(12) United States Patent
Brannock et al.

(10) Patent No.: US 7,844,809 B2
(45) Date of Patent: Nov. 30, 2010

(54) VERIFYING A TRUSTED SMI HANDLER

(75) Inventors: Kirk Brannock, Hillsboro, OR (US);
David Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 11/904,330

(22) Filed: Sep. 26, 2007

(65) Prior Publication Data

US 2009/0083532 A1   Mar. 26, 2009

(51) Int. Cl.
*G06F 9/00* (2006.01)
*G06F 21/00* (2006.01)
*G06F 11/30* (2006.01)
*G06F 13/24* (2006.01)
*G06F 15/00* (2006.01)
*G06F 11/00* (2006.01)
*G06F 7/04* (2006.01)

(52) U.S. Cl. .............................. 713/1; 713/2; 713/182; 713/187; 713/189; 710/260; 712/244; 714/38; 726/2; 726/26

(58) Field of Classification Search .................. 713/1, 713/2, 182, 187, 189; 710/260; 712/244; 714/38; 726/2, 26
See application file for complete search history.

(56) References Cited

U.S. PATENT DOCUMENTS

| | | | |
|---|---|---|---|
| 6,715,074 B1 * | 3/2004 | Chaiken | 713/164 |
| 6,993,648 B2 * | 1/2006 | Goodman et al. | 713/2 |
| 7,596,648 B2 * | 9/2009 | Ramgarajan et al. | 710/263 |
| 7,747,848 B1 * | 6/2010 | Nallagatla et al. | 713/2 |

* cited by examiner

*Primary Examiner*—Thuan N Du
*Assistant Examiner*—Stefan Stoynov
(74) *Attorney, Agent, or Firm*—Trop, Pruner & Hu, P.C.

(57) ABSTRACT

A trusted system management interrupt handler may be verified by first locating a signed system management interrupt handler image in system memory. The digital signature of the signed system management interrupt handler image is verified. An existing basic input/output system management interrupt handler is erased and replaced with a new system management interrupt handler image. Then an analysis is done of the system management interrupt handler message is to determine whether to continue to launch.

10 Claims, 2 Drawing Sheets

VERIFYING A TRUSTED SMI HANDLER

BACKGROUND

This relates generally to computer systems and, particularly, to system management interrupt (SMI) handlers.

A system management mode is an operating mode that enables an operating system transparent interrupt, known as a system management interrupt. The system management interrupt enables basic input/output system firmware to handle various platform level events at runtime. The basic input/output system system management interrupt handler has full and unfettered access to all hardware that is visible to normal operating system software.

A trusted computing system is any information system where access to data is controlled in a manner that restricts access to the data to a known set of hardware and software components. As used in that definition, data is information, secrets, and applications. Any component that has unfettered access to the data is known as a member of the trusted computing base (TCB). A member of the trusted computer base has access to the data and, therefore, the member must be trusted to work correctly. Access to data by non-TCB components is controlled explicitly by TCB components according to the TCB security policy.

Trusted execution technology establishes a trusted computing base using a launch process that begins in microcode. See Intel® Trusted Execution Technology, Preliminary Architecture Specification, November 2006, available from Intel® Corporation, Santa Clara, Calif. Software components in use during the launch process are cryptographically measured using a cryptographic hash algorithm. The component measurement values, or identity of the component, are securely stored in a trusted platform module using the extend mechanism provided by the trusted platform module. The identity of the trusted computing base is the cumulative identities, or measured values, of all of the trusted execution components.

DETAILED DESCRIPTION

Figure 1:
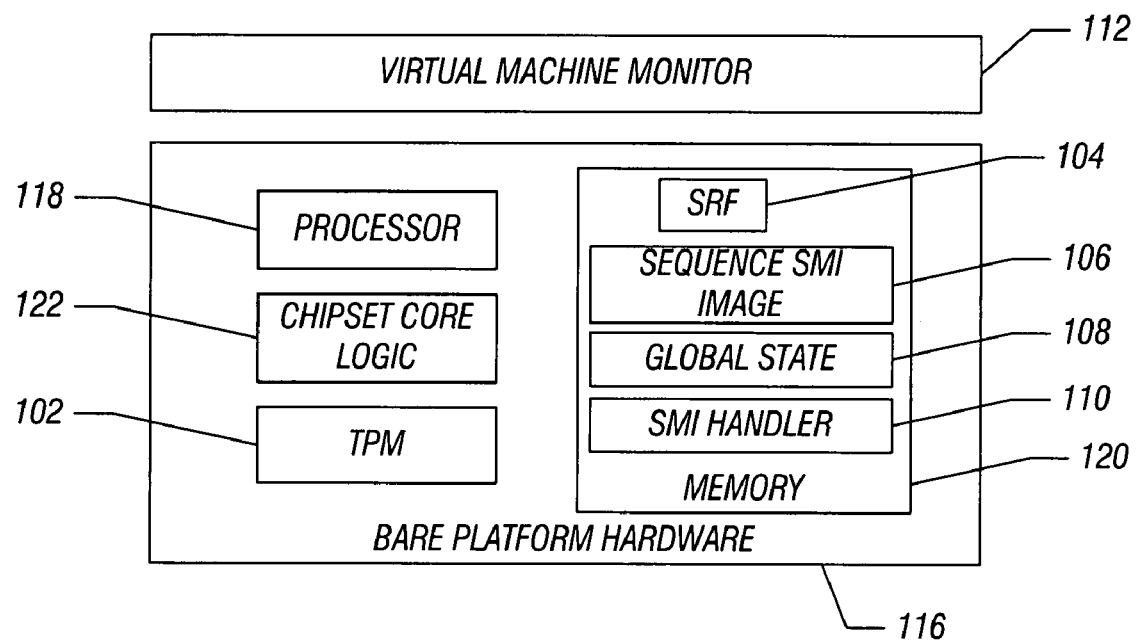
FIG. 1 is a hardware depiction of one embodiment of the present invention.

Referring to FIG. 1, a virtual machine environment includes a bare platform hardware 116. The bare platform hardware 116 includes system hardware, but does not include various bus devices, such as input/output devices, network interfaces, and external storage, as examples. The hardware 116 may comprise a computing platform that may be capable, for example, of executing a standard operating system or a virtual machine monitor 112.

The virtual machine monitor 112, though typically implemented in software, may emulate an export of bare machine interface to higher level software. Such higher level software may comprise a standard or real time operating system, may be a highly stripped down operating environment with limited operating system functionality or may not include a traditional operating system facility. Alternatively, for example, the virtual machine monitor 112 may be run within, or on top of, another virtual machine monitor. Virtual machine monitors may be implemented, for example, in hardware, software, firmware, or by any combination of these techniques.

The platform hardware 116 may be a personal computer, a mainframe, a handheld device, a personal computer, a set top box, or any other computing system. The platform hardware 116 may include a processor 118, memory 120, a chipset core logic 122, and a trusted platform module 102. The trusted platform module 102 may include a micro-controller and a memory. See Trusted Computing Group Trusted Platform Module Specification, Version 1.2, Revision 94, 29 Mar. 2006.

The processor 118 may be any type of processor capable of executing software, such as a microprocessor, a digital signal processor, a microcontroller, or the like. The processor 118 may include microcode, programmable logic, or hard coded logic for execution. Though FIG. 1 shows only one such processor, there may be multiple processors in the system.

The memory 120 may be a hard disk, a floppy disk, a random access memory, a read only memory, a flash memory, or any combination of the above places or any other type of machine readable medium. The memory 120 may store instructions and/or data for performing the execution of various embodiments.

The virtual machine monitor 112 presents, to other software, the abstraction of one or more virtual machines that may provide the same or different abstractions to various guests. Each of the guests may expect to access physical resources such as the processor registers, memory, and input/output devices within said virtual machines.

The memory 120 may include the system management interrupt handler 110, global states 108, a signed system management interrupt image 106, and a system management interrupt reload facility 104.

In accordance with one embodiment of the present invention, the system management interrupt handler 110 is treated as part of the trusted computing base. To include the system management interrupt handler 110 within the trusted computing base involves an accurate measurement of the handler 110. In particular, for many usage models, the measurement of the handler 110 may occur at the same time as measurement of the other trusted computing base members.

A system management interrupt may be intercepted with a trusted component which is part of the trusted computing base known as a system management interrupt transfer monitor which, in turn, enforces the necessary constraints on a system management interrupt handler 110. The system management interrupt transfer monitor is measured to the trusted platform module 102 during the launch process.

The system management interrupt transfer monitor and the trusted execution technology may, together, be used to secure the system management interrupt handler. The system management interrupt transfer monitor hardware mechanisms may be used to reload the basic input/output system system management interrupt handler 110 from a digital signed and verified pristine image. The measurement of this reloaded image is then presented to the trusted computing base in a manner that allows a policy decision to be made about whether or not to admit the reloaded system management interrupt handler into the trusted computing base.

The pre-launch image of the system management interrupt handler is irrelevant since it is discarded during the launch process. The component taking the place of the system management interrupt transfer monitor in this scheme is known as the system management interrupt reload facility 104.

The system management interrupt reload facility 104 is measured and configured, but does not containerize the basic input/output system system management interrupt handler or exclude it from the trusted computer base. Rather, the reload facility 104 performs certain steps after the system management interrupt is disabled in the processor 108 by a trusted launch process. Initially, the signed pristine system management interrupt image 110 is located in system memory 120. The digital signature of the handler image 110 is then verified. The signing of this image may use asymmetric cryptography like RSA, and the verification key or the public key, is bound to the platform hardware 116 in a manner that its value is set by the platform manufacturer and cannot be changed once the platform has completed manufacturing. This has the effect of binding the system management interrupt handler image to the platform hardware itself. Then, the existing system management interrupt handler is erased and replaced with a pristine system management interrupt handler image.

Next, there is a return to the calling process which is the trusted execution technology launch component such as the virtual machine monitor 112. The virtual machine monitor 112 evaluates the pristine system management interrupt handler measurement and makes a policy decision regarding continuation of the launch process. The monitor 112 then reestablishes a system management interrupt in the platform via a GETSEC[SMCTRL] instruction. This instruction provides additional control over specific conditions associated with safer mode extensions (SMX) architecture. Subsequent system management interrupts are handled by the newly reloaded system management interrupt handler.

Since the facility 104 performs the measurement of the system management mode at dynamic launch time, there is no execution of the system management mode between the dynamic launch and the evaluation of the measurement. As a result, there is no opportunity for malicious software to silently exploit the system management mode during the gap between measurement and the consumption of that measurement. Also, the facility 104 measures only the system management code, in one embodiment, rather than mixing the measurement with other unrelated components that are not part of the trusted computing base. As a result, different system management interrupt handlers may be loaded at launch time than were present during the basic input/output system power on self test. This can be leveraged to make the system management handler, present in the trusted environment, smaller than the default by removing features that are no longer necessary. This may effectively shrink the trusted computing base. A smaller trusted computing base may be better because the attacks surface on the trusted computing base itself is smaller and, therefore, there is less software that must be scrutinized for vulnerabilities.

Figure 2:
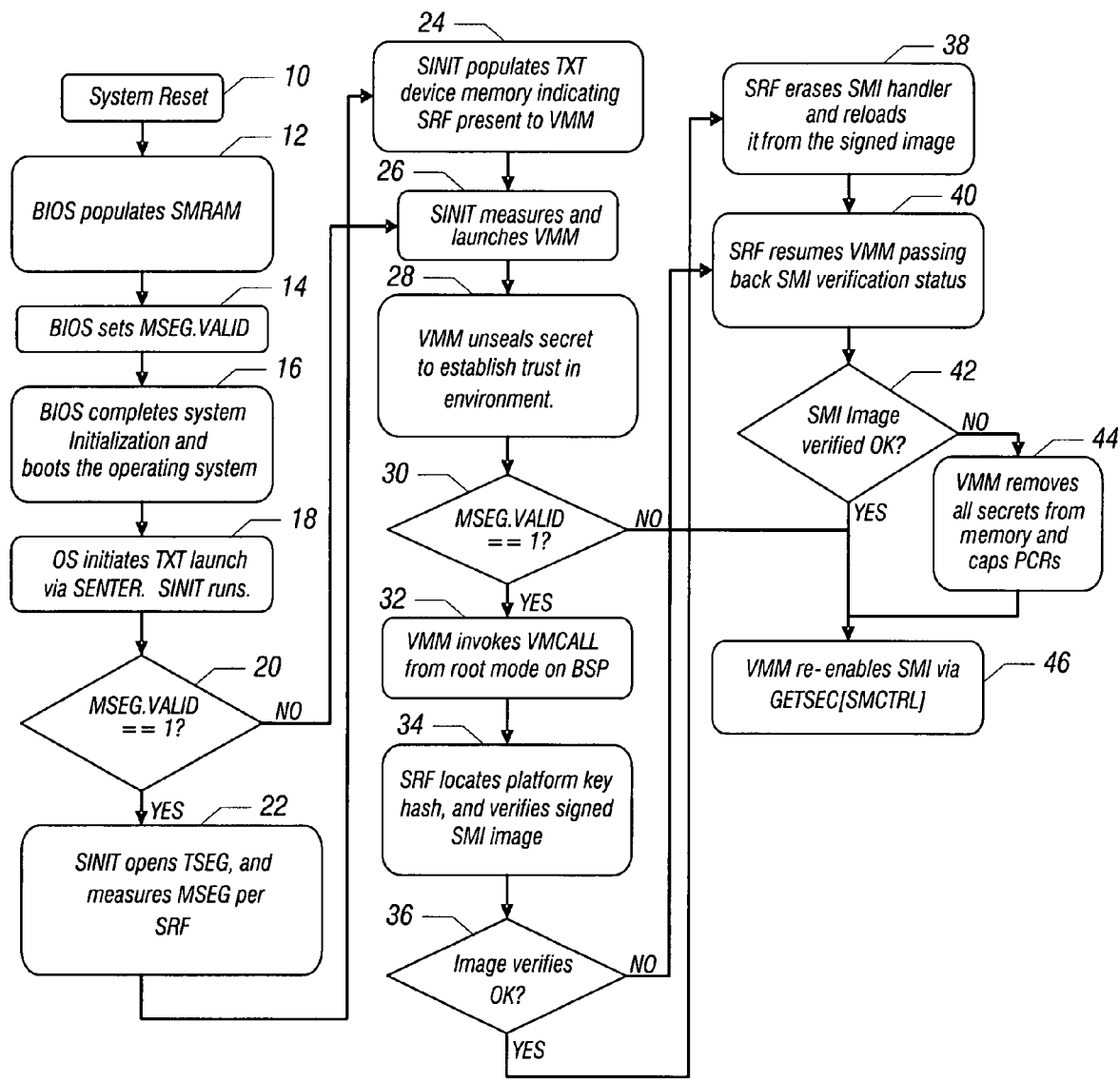
FIG. 2 is a flow chart for a sequencing in accordance with one embodiment of the present invention.

Referring to FIG. 2, in accordance with one embodiment, initially on the system reset indicated at 10, the basic input/output system populates the system management memory 120 with the components 104, 106, 108, and 110 as indicated at block 12. The basic input/output system sets variable MSEG.valid, as indicated at block 14. The basic input/output system then completes the system initialization and boots the operating system at block 16. The operating system initiates the trusted execution technology launch via the SENTER instruction provided by SMX and the function SINIT runs, as indicated at block 18.

A check at diamond 20 determines whether MSEG.valid equals one. If so, the SINIT function opens a trusted segment of the memory 120, which includes the components 104-110 and measures the memory segment using the SMI transfer monitor header or, more specifically, using the facility 104, as indicated in block 22. Then, SINIT populates the trusted execution technology device memory indicating the facility 104 is present to the virtual machine monitor 112, as indicated in block 24. In block 26, SINIT measures and launches the virtual machine monitor 112.

Then the virtual machine monitor unseals secrets to establish a trusted environment, as indicated in block 28. This trusted environment may include the facility 104 measurement. Then a check at diamond 30 determines whether the MSEG.valid variable is still equal to one. If so, the virtual machine monitor invokes the VM call from root mode on a bootstrap processor, as indicated in block 32. The facility 104, in block 34, locates the platform key hash, and verifies the signed SMI image.

At diamond 36, a check determines whether the image is correct. And if it is, the facility 104 erases the system management interrupt handler 110 and reloads it from the signed image, as indicated in block 38. The facility 104 resumes the virtual machine monitor, passing back the system management interrupt verification status, as indicated in block 40.

A check at diamond 42 determines whether the system management image is verified okay. If so, the virtual machine monitor 112 reenables the system management interrupt via the GETSEC[SMCTRL] instruction, as indicated in block 46. If the image is not verified okay, the monitor 112 removes all secrets from memory and platform configuration registers (block 44). A platform configuration register is a storage area that allows an unlimited number of measurements in a set amount of space.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer readable medium storing instructions that, if executed, enable a computer to:
   locate a signed system management interrupt handler image in system memory;
   verify the digital signature of the signed system management interrupt handler image;
   erase an existing basic input/output system system management interrupt handler and replace it with the signed system management interrupt handler image;
   return to a calling process; and
   enable the calling process to analyze system management interrupt handler measurements to decide whether to continue to launch.

2. The medium of claim 1 further storing an instruction to reenable a system management interrupt using the signed system management interrupt handler image.

3. The medium of claim 2 further storing instructions to enable a system management interrupt handler to be part of a trusted computing base.

4. The medium of claim 3 further storing instructions to store the measurements in a trusted platform module.

5. The medium of claim 4 further storing instructions to intercept a system management interrupt with a component of said trusted computing base.

6. A system comprising:
a processor;
a memory coupled to said processor, said memory including a signed system management interrupt handler image;
an interrupt reload facility to measure a system management mode at dynamic launch time; and
a virtual machine monitor to erase an existing basic input/output system management interrupt handler and replace it with the signed system management interrupt handler image and to analyze system management interrupt handler measurements to decide whether to continue to launch.

7. The system of claim 6, said monitor to re-enable a system management interrupt using the signed system management interrupt handler image.

8. The system of claim 7 including a trusted computing base that includes said basic input/output system management handler.

9. The system of claim 8 including a trusted platform module to store said measurements.

10. The system of claim 9, said processor to interrupt the system management interrupt with a component of said trusted computing base.

* * * * *